United States Patent

[11] 3,631,239

[72] Inventor James F. Kreider
 Santa Barbara, Calif.
[21] Appl. No. 48,979
[22] Filed June 24, 1970
[45] Patented Dec. 28, 1971
[73] Assignee Avco Corporation
 Cincinnati, Ohio

[54] SPECIMEN ALIGNMENT REFERENCE APPARATUS FOR BACK REFLECTION X-RAY CAMERA
 4 Claims, 2 Drawing Figs.

[52] U.S. Cl. .................................................... 250/51.5
[51] Int. Cl. ................................................... G01n 23/20
[50] Field of Search .......................................... 250/51.5;
 356/31, 138, 140, 153

[56] References Cited
 UNITED STATES PATENTS
 3,149,228 9/1964 Anselin et al. ................ 250/51.5
 2,847,579 8/1958 Allen et al. .................... 250/51.5 X

*Primary Examiner*—William F. Lindquist
*Attorneys*—Charles M. Hogan and Eugene C. Goodale ABSTRACT: A specimen alignment reference apparatus is disclosed which permits an operator to locate precisely a portion of a specimen relative to a reference point. A viewing device is adjustably supported above a reference plane. The viewing device is adjustable in the X and Z directions relative to the reference plane wherein the viewing device may be precisely aligned relative to a given reference point.

PATENTED DEC28 1971  3,631,239
INVENTOR.
JAMES F. KREIDER
BY
ATTORNEYS
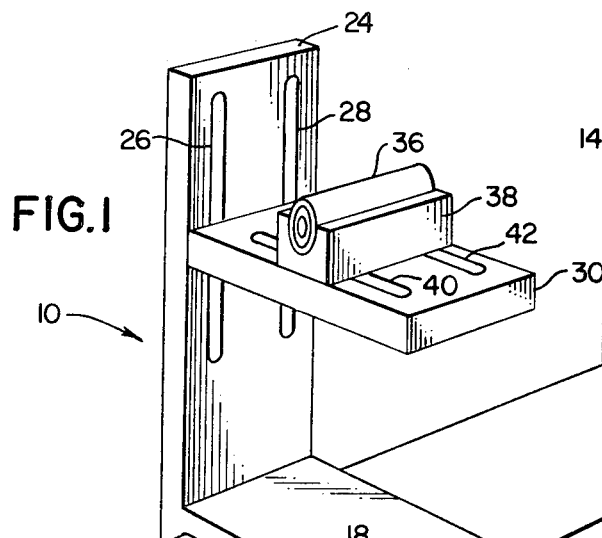
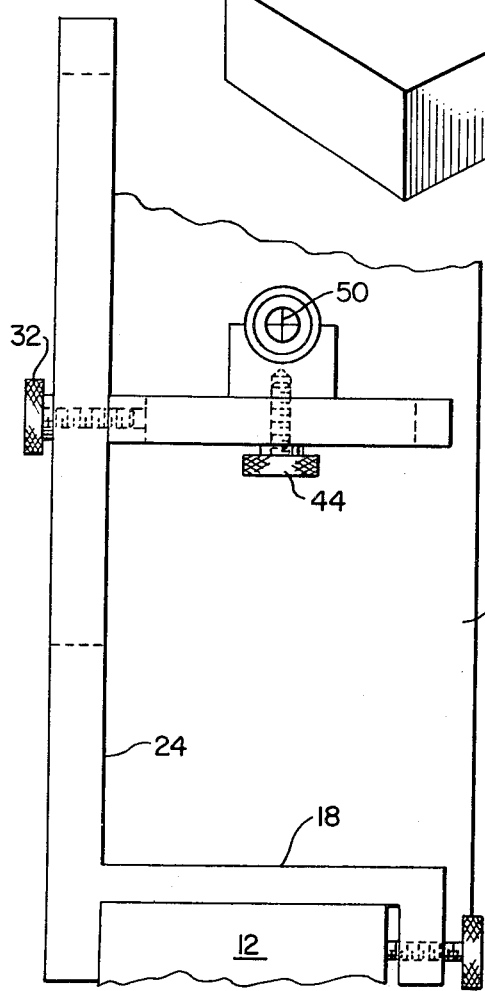

3,631,239

SPECIMEN ALIGNMENT REFERENCE APPARATUS FOR BACK REFLECTION X-RAY CAMERA

BACKGROUND OF THE INVENTION

This invention pertains to specimen alignment reference apparatus and more particularly an apparatus which allows a specimen to be aligned so that it will be positioned precisely relative to a given reference point.

In order to investigate or examine specimens by X-ray techniques, such as through the use of a back reflection X-ray camera of Griak Laue type, it is necessary that the specimen be precisely aligned in the X-ray beam. It is difficult to precisely position the specimen relative to the X-ray beam. Previously, the positioning has been done on a hit and miss type performance. As the size of the specimen decreases, the positioning becomes more critical. U.S. Pat. No. 3,555,275, issued Jan. 12, 1971, to James F. Kreider and assigned to the Avco Corporation provides an apparatus to position a specimen relative to a reference point in space in which the reference point was the X-ray beam in a back reflection X-ray camera. Although the invention of said application provides means to position a specimen, there is still no way of telling whether the specimen is aligned with the X-ray beam and also which part of the specimen is aligned with the X-ray beam.

Accordingly, it is an object of this invention to provide a specimen alignment reference apparatus which will insure that the specimen is precisely aligned relative to the X-ray beam without requiring energization of the X-ray beam.

Another object of this invention is to provide a specimen alignment reference apparatus which is inexpensive to manufacture and which, when used, allows an operator to precisely position a specimen so that the specimen will be in proper alignment with an X-ray beam.

An additional object is to provide a specimen alignment reference apparatus which does not touch the specimen.

Yet another object is to provide a specimen alignment apparatus wherein the specimen image is magnified which permits precise alignment of various portions of the specimens so that the X-ray beam is not incident upon unwanted areas of the specimen.

A further object of this invention is to provide a multipurpose specimen alignment reference apparatus which can be used as a compatible accessory in many applications and in particular with a back reflection X-ray camera.

SUMMARY OF THE INVENTION

This invention provides a specimen alignment reference apparatus for insuring that a specimen is properly aligned relative to a reference point in space, such as an X-ray beam. The apparatus provides a viewing device, adjustable in two axes, which may be aligned with the reference point in space or X-ray beam. The apparatus is then used as a reference in conjunction with a specimen is positioning apparatus for insuring that the specimen is properly aligned. The specimen alignment reference apparatus is of simple and economical construction, is easy to operate and can be easily installed for use.

Other details, uses, and advantages of this invention will become apparent as the following description of the exemplary embodiment hereof presented in the accompanying drawings proceeds.

BRIEF DESCRIPTION OF THE DRAWINGS

The accompanying drawings show a present exemplary embodiment of this invention in which:

FIG. 1 is a perspective view illustrating one exemplary embodiment of this invention mounted on an instrument track; and FIG. 2 is an end view of the apparatus of FIG. 1.

DESCRIPTION OF THE ILLUSTRATIVE EMBODIMENT

In the exemplary embodiment of FIG. 1 there is shown the alignment reference apparatus generally designated as 10 mounted on an instrument track 12 of a back reflection X-ray camera, not shown. A film cassette 14 having a collimator 16 therethrough is mounted at one end of the instrument track.

In the normal operation of this type of a specimen inspection, an incident X-ray beam is directed to the specimen through the collimator 16. The collimator 16 is positioned in the center of the film cassette 14 and of a sufficient length as to filter out a larger portion of the scattered radiation. A 1 mm. beam collimator is normally supplied with the camera, although collimators with various size openings are available as accessories.

To insure proper inspection, it is necessary that a specimen be precisely in alignment with the incident beam exiting through the collimator 16. To insure the precise specimen alignment, the alignment assembly 10 is mounted on the instrument track 12. The assembly 10 comprises a base member 18 which has a surface complementary with the surface of the instrument track 12. The base member 18 is secured to the instrument track by thumbscrews or the like 20 and 22. A vertical member 24 extends upwardly from one side of the base member 18. When the base 18 is secured to the instrument track, the vertical member 24 is positioned in a plane parallel to the incident beam.

The vertical member 24 has parallel slots 26 and 28 extending therethrough. A supporting member or stage 30 is slidably mounted to the support 24 by respective thumbscrews or the like 32, each of which extends respectively through slots 26 and 28 to engage the supporting stage 30.

A microscope 36, carried on a support 38, is mounted on stage 30. As can be seen, stage 30 has parallel slots 40 and 42 extending therethrough in a direction transverse to the axis of the incident beam and respective thumbscrews or the like 44 secure the microscope support 38 to the stage 30.

In operation, the microscope 36 is adjusted in the X and Z direction until the intersection of the crosshairs 50 of the microscope 36 coincides with the pinhole in the collimator 16 of the X-ray camera that will be used for the diffraction study. In the exemplary embodiment shown, adjusted in the X direction or adjustment of the microscope transverse or perpendicular to the axis of the incident beam is accomplished by loosening of the thumbscrews 44 and sliding the microscope support 38 relative to the support stage 30. Adjustment in the Z or vertical direction is accomplished by loosening of the thumbscrews 32 and adjusting the supporting stage 30 up and down relative to the support member 24. When the microscope 36 has been adjusted in this manner so that the intersection of the crosshairs 50 coincides with the pinhole in the collimator 16, then the position of the crosshairs 50 unambiguously defines where the incident X-ray beam will exit from the collimator 16.

A sample to be inspected is mounted in a holder, such as shown in the Kreider application aforementioned, and placed on the instrument track and the specimen brought into focus of the microscope 36. The crosshairs 50 of the microscope 36 indicate precisely what portion of the sample will be struck by the incident X-ray beam. By viewing the sample through the microscope 36, it will be apparent whether the sample is properly positioned for inspection. Should the sample be improperly positioned, it is now an easy matter to precisely adjust the sample to bring it into proper coincidence with the crosshairs 50 of the microscope 36. When the specimen has been properly positioned in its holder so as to coincide with the crosshairs 50, the specimen holder may be moved to its proper inspection position near one end of the instrument track 12 and adjacent the film cassette 14 through which the collimator 16 extends. In this manner, the operator knows that the specimen is properly positioned relative to the incident X-ray beam.

It has been found advantageous to provide an auxiliary track, which corresponds to the instrument track, to serve as the reference track. In this way, the microscope 36 is adjusted as above-described while on the instrument track 12. Once the microscope 36 is adjusted relative to the collimator 16, the apparatus 10 is removed from the instrument track 12 and mounted on the auxiliary track. The specimen holder with the specimen mounted is then mounted on the auxiliary track and positioned as previously described. After positioning relative to the crosshairs 50, the specimen holder is removed from the auxiliary track and positioned on the instrument track in proper inspection position. An advantage of using the auxiliary track is that the microscope reference is removed from the instrument track and the operator need not worry about accidentally causing the microscope to be misaligned during the actual X-ray investigation of the specimens.

Although the positioning means have been shown as a thumbscrew and slot arrangement, it is to be noted that this showing is only for illustrative purposes. Other adjusting arrangements could very well be used such as rack and pinion means, bellows means, parallel arm movements, etc.

The alignment apparatus of this invention also may be used to check the position of a powder sample mounted in standard powder cameras; a powder or flat sample mounted on a eucentric goniometer head in an oscillation-rotation camera; a flat sample mounted in a front surface holder; or a sample mounted in a universal sample manipulator.

It can be seen that some advantages of this invention are: (1) there is nothing physical to touch the sample and hence damage the surface as is the case with the usual indicating device sold with an eucentric goniometer head; (2) the sample is magnified which allows precise alignment of various portions of a sample so that the X-ray beam is not incident upon unwanted areas of the sample (specimens as small as one sixty-fourth inch in diameter have been aligned); (3) powder samples may be aligned without the need of the X-ray beam turned on to cause luminescence of paddle place behind the sample as is usually done, hence no need to have a room that can be darkened to aid in seeing the paddle and there is no radiation danger since the operator does no have to place his head near the diffracting sample to observe the paddle.

Further, the alignment apparatus of this invention can be used as a check to be sure that the collimators on the X-ray cameras are in the proper position to get maximum radiation from the focal spot of the X-ray tube. This is done by adjusting the crosshairs of the microscope onto the pinhole of the lineup pinhole. Then each X-ray camera is checked to see if the pinhole in its collimator is at the intersection of the crosshairs. If the position of the collimator is not correct, then the camera can be modified until the collimator is at the proper position. It is seen that this apparatus has multiple uses.

While a present exemplary embodiment of this invention has been illustrated and described, it will be recognized that this invention may be otherwise variously embodied and practiced by those skilled in the art.

What is claimed is:

1. A specimen alignment reference apparatus for precisely locating relative to an instrument track that portion of a specimen sample which is to be aligned with the incident beam exiting through a collimator for inspection through X-ray back reflection methods comprising:
   a base member for mounting on a instrument track, said member having a surface complementary with the instrument track;
   a vertical support member at one edge of said base member extending upwardly above the instrument track, said support member being perpendicular to the instrument track;
   a horizontal support member adjustably mounted to said vertical support member, said horizontal support member being perpendicular to said vertical support member and extending parallel over the instrument track;
   a microscope mounted on said horizontal support member for optically viewing in a direction parallel to the instrument track;
   adjusting means for vertically positioning said horizontal support member above the instrument track wherein the optical axis of said microscope is in a horizontal plane coincident with the collimator exit; and
   second adjusting means for adjusting said microscope in the horizontal plane relative to the instrument tract wherein the optical axis of said microscope is positioned in the vertical and horizontal planes so as to be coincident with the incidental beam which will exit through the collimator whereby viewing of a specimen sample mounted on the instrument track will indicate that portion of the sample which is in alignment with the incident beam.

2. Apparatus as set forth in claim 1 in which said vertical support member is formed with parallel slots therethrough extending in a vertical direction; and in which said first adjusting means comprises a pair of threaded screws extending respectively through said parallel slots to securedly engage said horizontal support member.

3. Apparatus as set forth in claim 2 in which said horizontal support member is formed with parallel slots therethrough so that said slots extend tranversely of the instrument track when said horizontal support member is secured to said vertical support member, and in which said second adjusting means comprises a pair of threaded screws respectively extending through the slotted horizontal support member to securedly engage said microscope.

4. Apparatus as set forth in claim 3 further comprising thumbscrews extending through said base member for engaging the instrument track to locate said base member with the instrument track.

* * * * *